United States Patent
Ahmed et al.

(10) Patent No.: US 11,469,809 B2
(45) Date of Patent: Oct. 11, 2022

(54) COMPRESSION OF TAP LOCATION INFORMATION FOR TIME DOMAIN EXPLICIT CHANNEL STATE INFORMATION FEEDBACK IN NEW RADIO

(71) Applicant: Nokia Technologies Oy, Espoo (FI)

(72) Inventors: Rana Ahmed, Munich (DE); Thorsten Wild, Stuttgart (DE); Keeth Saliya Jayasinghe Laddu, Espoo (FI); Mihai Enescu, Espoo (FI); Xiaomao Mao, Hangzhou (CN); Wolfgang Zirwas, Munich (DE); Rakash SivaSiva Ganesan, Unterhaching (DE); Amir Mehdi Ahmadian Tehrani, Karlsfeld (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/045,510

(22) PCT Filed: Apr. 13, 2018

(86) PCT No.: PCT/CN2018/083114
§ 371 (c)(1),
(2) Date: Oct. 6, 2020

(87) PCT Pub. No.: WO2019/196121
PCT Pub. Date: Oct. 17, 2019

(65) Prior Publication Data
US 2021/0175949 A1  Jun. 10, 2021

(51) Int. Cl.
*H04W 4/00* (2018.01)
*H04B 7/06* (2006.01)
(Continued)

(52) U.S. Cl.
CPC ......... *H04B 7/0626* (2013.01); *H04B 7/0658* (2013.01); *H04L 25/022* (2013.01); *H04L 25/0214* (2013.01); *H04L 27/26025* (2021.01)

(58) Field of Classification Search
None
See application file for complete search history.

(56) References Cited

U.S. PATENT DOCUMENTS

| | | | |
|---|---|---|---|
| 7,221,699 B1 * | 5/2007 | Lindskog | H04L 25/0214 375/147 |
| 2002/0090060 A1 * | 7/2002 | Rudinsky | G06Q 10/06 379/27.01 |

(Continued)

FOREIGN PATENT DOCUMENTS

| | | |
|---|---|---|
| CN | 107483091 A | 12/2017 |
| EP | 2139124 B1 | 3/2014 |

(Continued)

OTHER PUBLICATIONS

Partial Supplementary European Search Report received for corresponding European Patent Application No. 18914033.8, dated Oct. 8, 2021, 12 pages.

(Continued)

*Primary Examiner* — Clemence S Han
(74) *Attorney, Agent, or Firm* — Harrington & Smith

(57) ABSTRACT

Methods, apparatus, and computer program products for a user equipment receiving CSI-RS and computing channel support information. Based on the CSI, the UE derives tap locations of channel support, depending on the observed channel and used subcarrier spacing. The deriving can additionally be done in relation to power class and window size. The UE apprises a base station of those tap locations of the channel support and also informs the base station of the strongest tap locations, which can be done in various ways comprising a bit mask. Methods, apparatus, and computer (Continued)

program products for a base station to send CSI-RS to a UE for computing CSI feedback. The CSI-RS resources can be for one or multiple transmit receive points. The base station receives back an indication of tap locations and a bit mask and builds information on tap locations by combining that received indication and bit mask.

12 Claims, 9 Drawing Sheets

(51) Int. Cl.
*H04L 27/26* (2006.01)
*H04L 25/02* (2006.01)

(56) References Cited

U.S. PATENT DOCUMENTS

| | | | | |
|---|---|---|---|---|
| 2006/0039459 | A1* | 2/2006 | Kolze | H04L 25/03019 375/232 |
| 2006/0176987 | A1* | 8/2006 | Malladi | H04L 27/26 375/346 |
| 2006/0233269 | A1* | 10/2006 | Bhushan | H04L 27/2662 375/147 |
| 2007/0211806 | A1* | 9/2007 | Mudulodu | H04L 25/0232 375/260 |
| 2010/0008431 | A1 | 1/2010 | Wu et al. | |
| 2010/0158160 | A1* | 6/2010 | Mukkavilli | H04L 25/023 375/340 |
| 2011/0085460 | A1 | 4/2011 | Zhang et al. | |
| 2011/0103497 | A1* | 5/2011 | Wilhelmsson | H04L 25/022 375/260 |
| 2011/0197071 | A1* | 8/2011 | Wolcott | H04L 25/03019 713/176 |
| 2015/0049824 | A1 | 2/2015 | Kim et al. | |
| 2015/0312008 | A1* | 10/2015 | Annavajjala | H04L 25/022 370/252 |
| 2015/0341101 | A1 | 11/2015 | Park et al. | |
| 2016/0087769 | A1* | 3/2016 | Wild | H04L 5/0057 370/329 |
| 2016/0285660 | A1 | 9/2016 | Frenne et al. | |
| 2017/0257246 | A1* | 9/2017 | Zhuang | H04L 25/0256 |
| 2019/0271774 | A1* | 9/2019 | Zhang | G01S 13/87 |

FOREIGN PATENT DOCUMENTS

| | | |
|---|---|---|
| WO | 2006/009510 A1 | 1/2006 |
| WO | 2016/115655 A1 | 7/2016 |
| WO | 2019/099024 A1 | 5/2019 |

OTHER PUBLICATIONS

Wild et al., "Multi-antenna OFDM channel feedback compression exploiting sparsity", European Wireless 2013; 19th European Wireless Conference, Apr. 16-18, 2013, pp. 1-6.

"Rank-2 W2 Codebook for Advanced CSI Reporting", 3GPP TSG-RAN WG1 #87, R1-1612664, Agenda: 6.2.2.1.1, Ericsson, Nov. 14-18, 2016, pp. 1-6.

"Type II CSI Feedback", 3GPP TSG-RAN WG1 #87, R1-1612351, Agenda: 7.1.3.3, Ericsson, Nov. 14-18, 2016, 10 pages.

Zirwas et al., "Flexible 5G below 6GHz Mobile Broadband Radio Air Interface", IEEE 83rd Vehicular Technology Conference (VTC Spring), May 15-18, 2016, 5 pages.

Jungnickel et al., "The Role of Small Cells, Coordinated Multi-point and Massive MIMO in 5G", IEEE Communications Magazine, vol. 52, No. 5, May 2014, pp. 44-51.

Zirwas, "Opportunistic CoMP for 5G massive MIMO Multilayer Networks", 19th International ITG Workshop on Smart Antennas, Mar. 3-5, 2015, 7 pages.

"3rd Generation Partnership Project; Technical Specification Group Radio Access Network; Evolved Universal Terrestrial Radio Access (E-UTRA); Physical channels and modulation (Release 15)", 3GPP TS 36.211, V15.0.0, Dec. 2017, pp. 1-219.

"3rd Generation Partnership Project; Technical Specification Group Radio Access Network; NR; Physical channels and modulation (Release 15)", 3GPP TS 38.211, V1.0.0, Sep. 2017, pp. 1-37.

Wild, "A Rake-Finger Based Efficient Channel State Information Feedback Compression Scheme for the MIMO OFDM FDD Downlink", IEEE 71st Vehicular Technology Conference, May 16-19, 2010, 5 pages.

Murthy et al., "Lossless Compression Using Efficient Encoding of Bitmasks", IEEE Computer Society Annual Symposium on VLSI, May 13-15, 2009, pp. 163-168.

Ahmed et al., "Explicit CSI Feedback Design for 5G New Radio phase II", 22nd International ITG Workshop on Smart Antennas, Mar. 14-16, 2018, 5 pages.

"Motivation for new WI: Enhancements on MIMO for NR", 3GPP TSG RAN Meeting #78, RP-172767, Agenda: 9.1.1, Samsung, Dec. 18-21, 2017, 9 pages.

"New WID Proposal: Enhancements on MIMO for NR", 3GPP TSG RAN Meeting #78, RP-172766, Agenda: 9.1.1, Samsung, Dec. 18-21, 2017, 5 pages.

"Summary of CSI Enhancement for MU-MIMO", 3GPP TSG RAN WG1 Ad-Hoc Meeting 1901, R1-1901075, Agenda: 7.2.8.1, Samsung, Jan. 21-25, 2019, 16 pages.

"Summary of Tuesday Offline Session on MU-MIMO CSI Enhancement", 3GPP TSG RAN WG1 Ad-Hoc Meeting 1901, R1-1901396, Agenda: 7.2.8.1, Samsung, Jan. 21-25, 2019, 4 pages.

International Search Report and Written Opinion received for corresponding Patent Cooperation Treaty Application No. PCT/CN2018/083114, dated Jan. 7, 2019, 9 pages.

"On TRS Design", 3GPP TSG-RAN WG1 Meeting #90, R1-1713713, Agenda: 6.1.2.3.6, MediaTek Inc, Aug. 21-25, 2017, 14 pages.

Extended European Search Report received for corresponding European Patent Application No. 18914033.8, dated Feb. 2, 2022, 14 pages.

* cited by examiner

COMPRESSION OF TAP LOCATION INFORMATION FOR TIME DOMAIN EXPLICIT CHANNEL STATE INFORMATION FEEDBACK IN NEW RADIO

RELATED APPLICATION

This application was originally filed as PCT Application No. PCT/CN2018/083114 on Apr. 13, 2018, which is hereby incorporated in its entirety.

TECHNICAL FIELD

This invention relates generally a signaling format between a user equipment and base station with an effective beamformed channel with low feedback signaling overhead and, particular, to compressing the combination of beam indices and tap locations' overhead by exploiting the common channel support assumption.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

In FDD (or some TDD systems e.g. without proper calibration), a UE has to send back the DL channel information to a gNB due to the absence of channel reciprocity. The gNB uses this information to build the DL precoding matrices. In LTE and NR phase I, the UE sends back one or more indices called Precoding Matrix Indicator(s) known as PMI, which point to one or more codeword(s) in a predetermined codebook known at UE and gNB sides. The codebook is based on DFT precoding.

For NR phase II, in order to obtain a more accurate description of the channel at the gNB, needed for improved MU-MIMO performance and more advanced schemes such as non-linear precoding, coordinated multi-point transmission (CoMP) or Interference Alignment (IFA), one proposal is for the UE to send back the channel impulse response (CIR) in the time domain. Because of the sparseness of the communication signal, many taps don't have to be reported which eventually reduces the feedback overhead.

Previous writings that may be useful as background to the current invention, some of which have been referred to in the text herein, may include the following:

3GPP TS 36.211 Evolved Universal Terrestrial Radio Access (E-UTRA); Physical channels and modulation (Release 13);

3GPP TS 38.211 V1.0.0 (2017-09) Technical Specification Group Radio Access Network; NR; Physical channels and modulation (Release 15);

T. Wild. A Rake-Finger Based Efficient Channel State Information Feedback Compression Scheme for the MIMO OFDM FDD Downlink. In Proc. IEEE Vehicular Technology Conf., VTC-Spring, pages 1-5, May 2010;

"OFDM channel feedback compression based on a RAKE approach", T. Wild, EP2,139,124B1

Marzetta, T., Larsson, E., Yang, H., & Ngo, H. (2016). Fundamentals of Massive MIMO. Cambridge: Cambridge University Press;

C. Murthy and P. Mishra, "Lossless Compression Using Efficient Encoding of Bitmasks," 2009 *IEEE Computer Society Annual Symposium on VLSI*, Tampa, Fla., 2009, pp. 163-168;

R. Ahmed, E. Visotsky and T. Wild, "Explicit CSI Feedback Design for 5G New Radio phase II" submitted to WSA 2018;

RP-172767 "Motivation for new WI: Enhancements on MIMO for NR" RAN# 78 Dec. 2017; and RP-172766 "3GPP™ Work Item Description" 3GPP TSG RAN Meeting #78 Dec. 2017.

The current invention moves beyond these techniques.

Acronyms or abbreviations that may be found in the specification and/or the drawing figures are defined within the context of this disclosure or as follows below:

3GPP Third Generation Partnership Project
5G 5th Generation
ACK Acknowledgement
BS Base Station
BW Bandwidth
CIR Channel Impulse Response
COMP Coordinated Multi-Point
CSI Channel State Information
CSI-RS Channel State Information-Reference Signals
CQI Channel Quality Information
DCI Downlink Control Information
DFT Discrete Fourier Transform
DL Downlink
eMBB enhanced Mobile Broadband
FDD Frequency Division Duplex
GoB Grid of Beams
gNB base station in NR or NR/5G Node B
HARQ Hybrid Automatic Repeat Request
IFA Interference Alignment
IP Internet Protocol
IMT International Mobile Telecommunications (4/4.5G or 5G)
LLC Low-Latency Constraint
LTE Long Term Evolution
LTE-A Long Term Evolution—Advanced
MCS Modulation and Coding Scheme
MBB Mobile Broadband
MIMO Multiple Input Multiple Output
mMIMO massive-MIMO
MME Mobility Management Entity
MSG Message
MSE Mean Square Error
MTC Machine-Type Communications
MU-MIMO Multi-user MIMO
NCE Network Control Entity
NR New Radio
OFDM Orthogonal Frequency Division Multiplexing
PBCH Physical Broadcast Channel
PF Proportionally Fair
PI Preemption Indication.
PMI Precoder Matrix Indicator
PRB Physical Resource Block
PUCCH Physical Uplink Control Channel
PUSCH Physical Uplink Shared Channel
RB Resource Block
Rel Release
RE Resource Element
RS Reference Signal
RRC Radio Resource Control
Rx Receive, Reception, or Receiver
SCS Subcarrier Spacing
TB Transport Block TBS Transport Block Size
TS Technical Specification
TRP Transmission reception point
TTI Transmission Time Interval
Tx Transmit, Transmission, or Transmitter
UE User Equipment
UL Uplink
ULA Uniform linear array

BRIEF SUMMARY

This section is intended to include examples and is not intended to be limiting. The word "exemplary" as used herein means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

An example of an embodiment of the current invention is a method that comprises receiving, by a user equipment, channel state information reference signal; computing channel support information; deriving, based on the channel state information, $N_s$ tap locations of channel support, depending on the observed channel and used subcarrier spacing, wherein $N_s$ tap locations is a subset of all tap locations present; apprising a base station of the $N_s$ tap locations of the channel support; and informing the base station of strongest tap locations, for use in building a channel frequency response.

Another example of an embodiment of the current invention is a method that comprises indicating, by a base station to a user equipment, channel state information reference signal resources for computing channel state information feedback, where the channel state information reference signal resources can be for one or multiple transmit receive points; receiving, by the base station from the user equipment, an indication of $N_s$ tap locations and a bit mask; and building, by the base station, information on tap locations by combining the received indication and bit mask.

An example of a further embodiment of the current invention is a computer program product embodied on a non-transitory computer-readable medium in which a computer program is stored that, when being executed by a computer, is configured to provide instructions with code to control or carry out: receiving, by a user equipment, channel state information reference signal; computing channel support information; deriving, based on the channel state information, $N_s$ tap locations of channel support, depending on the observed channel and used subcarrier spacing, wherein $N_s$ tap locations is a subset of all tap locations present; apprising a base station of the $N_s$ tap locations of the channel support; and informing the base station of strongest tap locations, for use in building a channel frequency response.

An example of a still further embodiment of the current invention is a computer program product embodied on a non-transitory computer-readable medium in which a computer program is stored that, when being executed by a computer, is configured to provide instructions with code to control or carry out: indicating, by a base station to a user equipment, channel state information reference signal resources for computing channel state information feedback, where the channel state information reference signal resources can be for one or multiple transmit receive points receiving, by the base station from the user equipment, an indication of $N_s$ tap locations and a bit mask; and building, by the base station, information on tap locations by combining the received indication and bit mask.

An example of another embodiment of the current invention is an apparatus that comprises means for receiving channel state information reference signal; means for computing channel support information; means for deriving, based on the channel state information, $N_s$ tap locations of channel support, depending on the observed channel and used subcarrier spacing, wherein $N_s$ tap locations is a subset of all tap locations present; means for apprising a base station of the $N_s$ tap locations of the channel support; and means for informing the base station of strongest tap locations, for use in building a channel frequency response.

An example of yet another embodiment of the current invention is an apparatus that comprises means for indicating, to a user equipment, channel state information reference signal resources for computing channel state information feedback, where the channel state information reference signal resources can be for one or multiple transmit receive points; means for receiving, from the user equipment, an indication of $N_s$ tap locations and a bit mask; and means for building information on tap locations by combining the received indication and bit mask.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Massive multiple input multiple output (mMIMO) systems are expected to boost the data throughput and reliability in future 5G systems. In order to enable advanced radio concepts in New Radio (NR) phase II, such as multiple transmit receive point (multi-TRP) transmission, accurate channel state information (CSI) knowledge at gNB side is essential.

Figure 1:
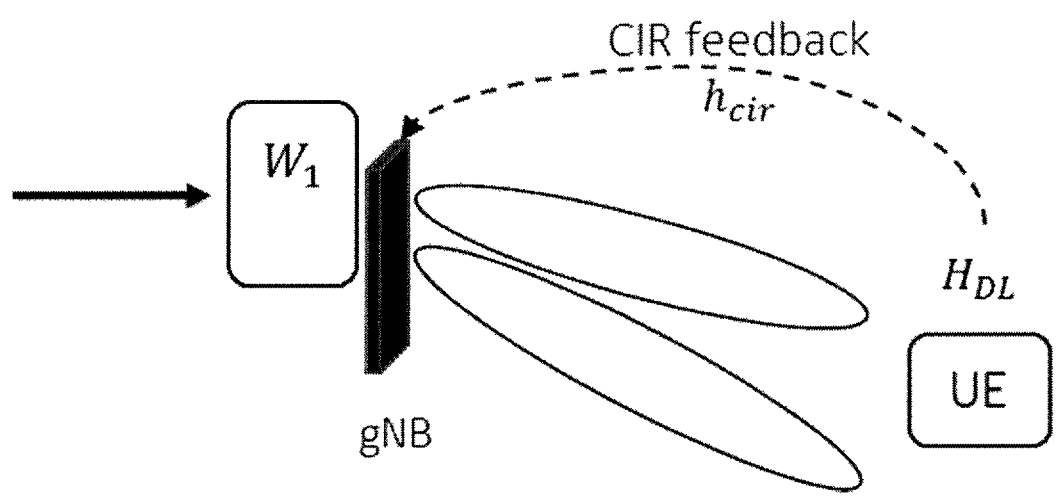
FIG. 1 is a diagram of explicit CSI Feedback in FDD.

The explicit feedback of the CIR can also be reported for an effective beamformed channel. By, for instance, employing a grid-of-beams (GoB) $W_1$ precoder, the dimensions of the channel reduce from $M \times N_s$ where M is the number of transmit antennas and N is the number of receive antennas to $B \times N_s$ where B is the number of transmit beams employed. A natural consequence from that is having narrower beams with higher gains, and a sparser CIR in the time domain, due to channel hardening. In addition, the number of reference signals needed to train the whole system reduces accordingly. The CIR sent back is then of dimension $$h_{CIR_{N \times B \times N_T}},$$

where $N_T$ is the whole time delay range of the CIR (sampled in taps) in one path. Note that the sparseness of the time domain signal means that $B.N.N_T$ is much higher than the actual number of significant channel taps across all paths, which we denote here by $k_{taps}$, i.e. $B.N.N_T \gg k_{taps}$ The time domain channel information can be represented using the time domain channel matrix $h_{NB \times N_T}$, where $c_{p,x}$ is the complex coefficient on the $p^{th}$ path (out of N.B paths) and sampled delay # $\tau$, as shown in FIG. 1, which is a diagram of explicit CSI Feedback in FDD. A path is defined as the channel between transmit antenna (or transmit beam) and a receive antenna (or a receive beam).

In addition to the tap values, the UE has to feedback the tap locations to the gNB, namely, which of the taps in the channel matrix $h_{NB \times N_T}$, shown in FIG. 1, is active and which is assumed to be zero. For users with low mobility, this information doesn't change quickly and thus can be sent sporadically on long intervals. For users with high mobility, however, the locations of the significant tap locations will change more rapidly and thus will need to be updated frequently.

$$h_{NB \times N_T} = \begin{bmatrix} c_{1,1} & c_{1,N_T} \\ c_{NB,1} & c_{NB,N_T} \end{bmatrix} \quad (1)$$

Note that for NR Rel. 16 there is a study item proposal for advanced feedback methods for MIMO enhancements. As one of the Nokia proposals is to include techniques for time domain based compression of the explicit CSI feedback information as submitted in RAN plenary #78, the content of our invention is a candidate technology within this study item.

For (massive-)MIMO channel state information at the transmitter, a problem is to find an efficient signalling of associated time-domain tap delays combined with respective beams, so that an effective beamformed channel can be described explicitly with low feedback signalling overhead.

The present invention is a practical explicit CSI feedback scheme, which exploits time domain channel sparseness. A heuristic greedy algorithm is used to discover the channel support and feed it back to the gNB. Simulation results, comparing the proposed approach against recently standardized NR phase I Type II CSI feedback, show an improved performance for the design and method proposed herein.

Using the system model is shown in FIG. 1, we use a grid-of-beams (GoB) precoder $W_1$ to reduce the dimension of the channel from M transmit antennas to 2L beams, where L is the number of beams per polarization. By deploying the GoB precoder, the equivalent channel in the time domain becomes more sparse, due to the effect of channel hardening, hence it further compresses the amount of significant feedback that needs to be fed back to the gNB. After $W_1$, comes the free precoder $W_j$ which uses the explicit CSI knowledge to perform advanced DL precoding.

For example, assuming a case where for a set of B beams $k_{taps}=40$ taps should be fed back to the gNB and assuming N=2, B=8 and $N_T=256$. Assuming that the short term feedback is done every 10 ms, with a resolution of 8 bits per channel tap, results in an overhead of $$\frac{(k_{taps} \times 8)}{10 \text{ ms}} = 32 \text{ kbps}$$

to feedback the channel taps' values. In general, some feedback information needs to be updated more frequently and is sent on short term basis, as such it is denoted as short term feedback, whereas other feedback information changes more slowly and thus is sent on long term basis, as such it is denoted as long term feedback. The amplitude and phase components of the complex CIR would be characterized as short term feedback whereas the tap location information would be characterized as long term feedback.

In practice, an oversampling factor is used inside the compressive sensing algorithm to deal with the fact that the channel taps are not aligned to the sampling raster. Therefore, assuming an oversampling factor OS=16, sending the location of one channel tap requires an overhead of $\log_2(N \times B \times N_T \times OS)$, therefore sending all tap locations require an additional feedback overhead of $k_{taps} \times \log_2(N \times B \times N_T \times OS)$, which translates to an overhead of 640 bits per UE per time instant. If it is required to update this information every 50 ms for a fast user, this requires a feedback rate (just for the tap location information) of 12.8 kbps. That means sending the tap locations constitute around 28.5% of the total overhead.

Assuming maximum channel length of 72 samples (CP length in a bandwidth of 10 MHz), the overall channel length after oversampling with (OS=16), becomes 1168 samples.

One method used in prior art was to indicate a window to the gNB, indicating the start and end of the active taps.

Figure 2:
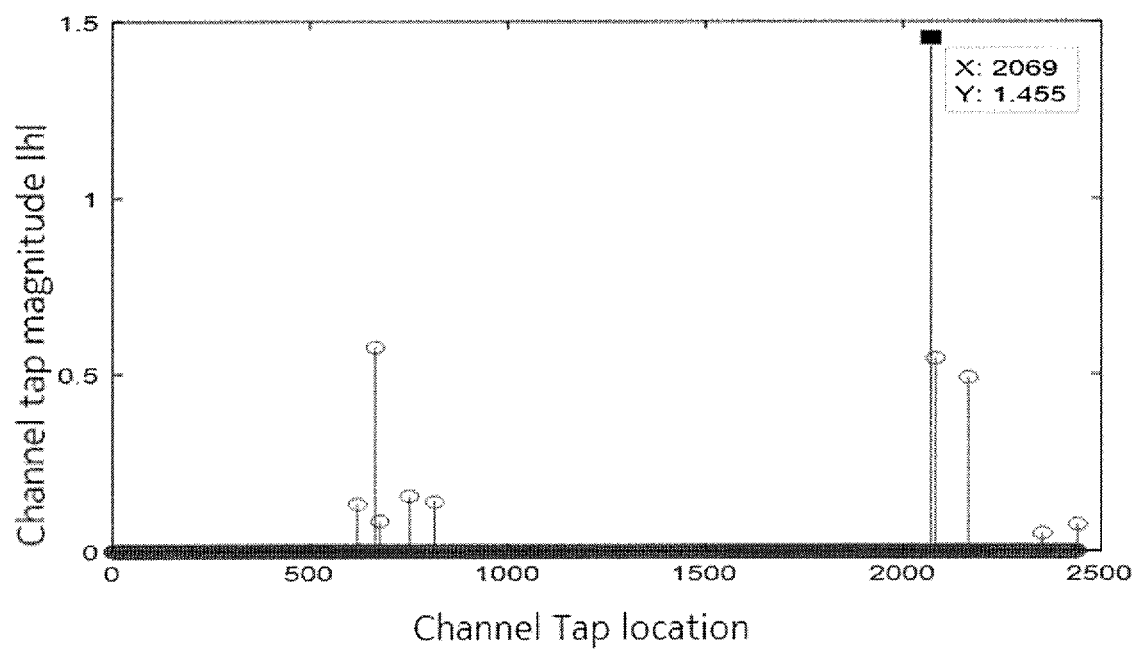
FIG. 2 is a graph of channel support of one user for one path, with channel tap magnitude |h| versus channel tap location.

As shown in FIG. 2, in the channel support for one path (transmit-receive beam), especially with oversampling, the significant channel taps are found to be spread within a range of 1000 taps locations. Hence, applying a window over this big range requires a large feedback overhead to indicate the information which of those taps within the window range are active.

Another solution would be to use a smaller window, for example in the range of tap locations from 2069 to 2100 in the FIG. 2, and ignore the rest of the CIR taps. This can reduce the amount of feedback overhead at the expense of reduced feedback accuracy.

The idea of the invention is to compress the combination of beam indices and tap locations' overhead by exploiting the common channel support assumption. The channel support is the location of the significant time domain channel taps in a CIR and is therefore related to the power-delay profile. Co-located transmit/receive antennas or transmit/receive beams formed from co-located transmit/receive antennas share the same dominant taps, namely, channel support, when the fast fading is averaged out.

Figure 3:
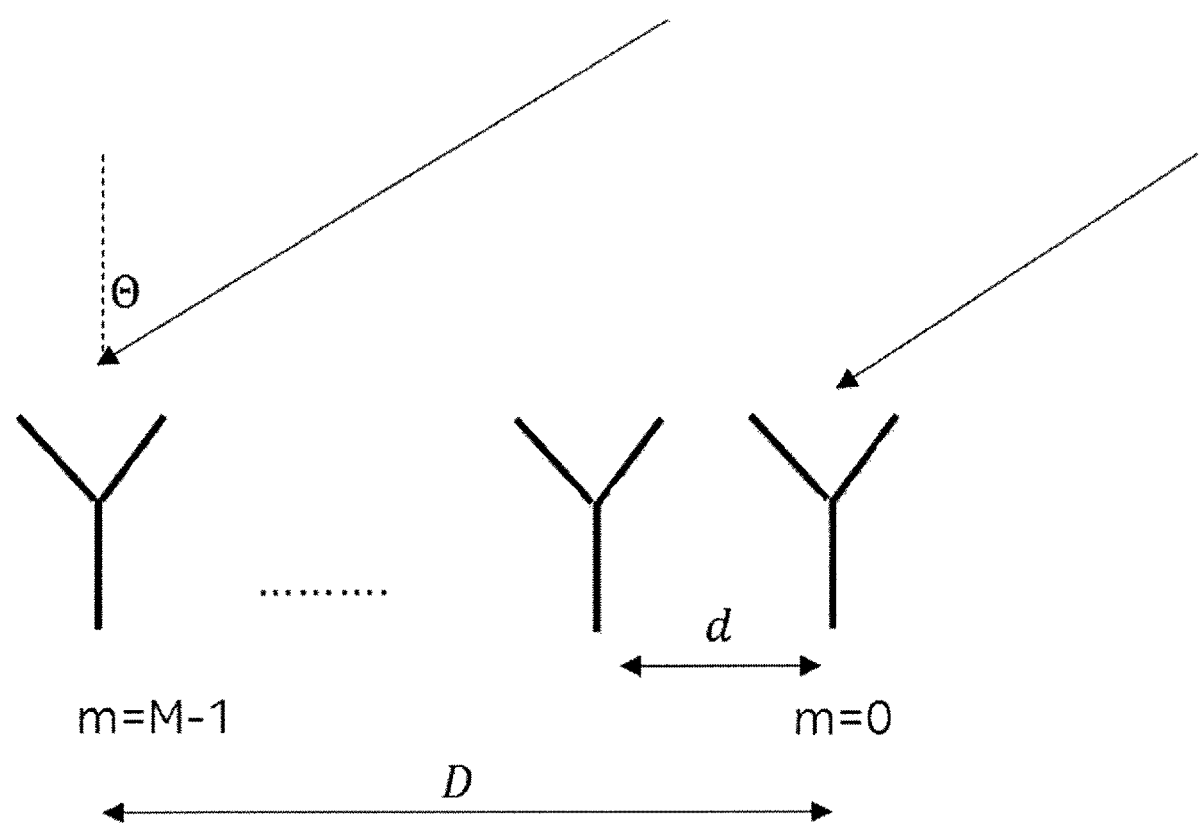
FIG. 3 is a diagram of arrival times in a ULA.

To understand the common channel support assumption, a uniform linear array is considered, as shown in FIG. 3, which shows arrival times in a ULA. The signal is assumed to arrive at the $0^{th}$ antenna element at time $t_1$ and at the antenna element $M-1$ at time $t_2$ (where with an array of M elements, the first element is at position 0 and the last at position $M-1$. Alternatively the first element can be at position 1 and the last element at position M). The difference in the time of arrival is then $$\tau = t_1 - t_2 = \frac{D\sin(\theta)}{c},$$

where c is the speed of light, D is the maximum antenna aperture, and $\theta$ is the angle of incidence as shown in FIG. 3. In order for the antenna element at $M-1$ to see the incoming signal delayed by one sampling time interval T or more, then $$\tau_{max} = \frac{D}{c} \geq \frac{1}{BW}.$$

This is also consistent with the 3GPP channel model, which confirms this assumption for bandwidth smaller than $$\frac{c}{D}.$$

For example at carrier frequency $f_c=2$ GHz, and an antenna array of size 32×32, the maximum antenna aperture is $$D = 31 \times \frac{\lambda}{2}.$$

The narrow band assumption is valid for bandwidth, where $$BW < \frac{c}{D} = \frac{f_c \lambda}{15.5\lambda} = 129 \text{ MHz}.$$

Since our target here is below 6 GHz transmission, with bandwidth in the range of 10-20 MHz, this assumption of a common channel support is valid.

By exploiting this information, that the common channel support assumption is valid and can be exploited for not so large bandwidths and not so large antenna arrays (i.e. what is discussed in the previous paragraphs), the location of the tap locations can be sent in two steps. In the first step, the channel support is conveyed, namely, the active columns of the time domain channel matrix. This significantly narrows down the possible tap locations. In a second step, a bit mask which can indicate the locations of the active taps within the already narrowed down set of possible locations is transmitted. A bit mask is a matrix whose elements can take either the value of '1' or '0'.

As mentioned above, for transmit/receive beams formed from co-located transmit/receive antennas, the location of the significant taps is the same for all B×N paths, where, as described earlier herein, B and N are defined as the number of beams and the number of receive antennas, where B and N are multiplied here. In FIG. 2, we can see a snapshot of the CIR of all B.N aggregated paths after $W_1$ precoding.

Figure 4:
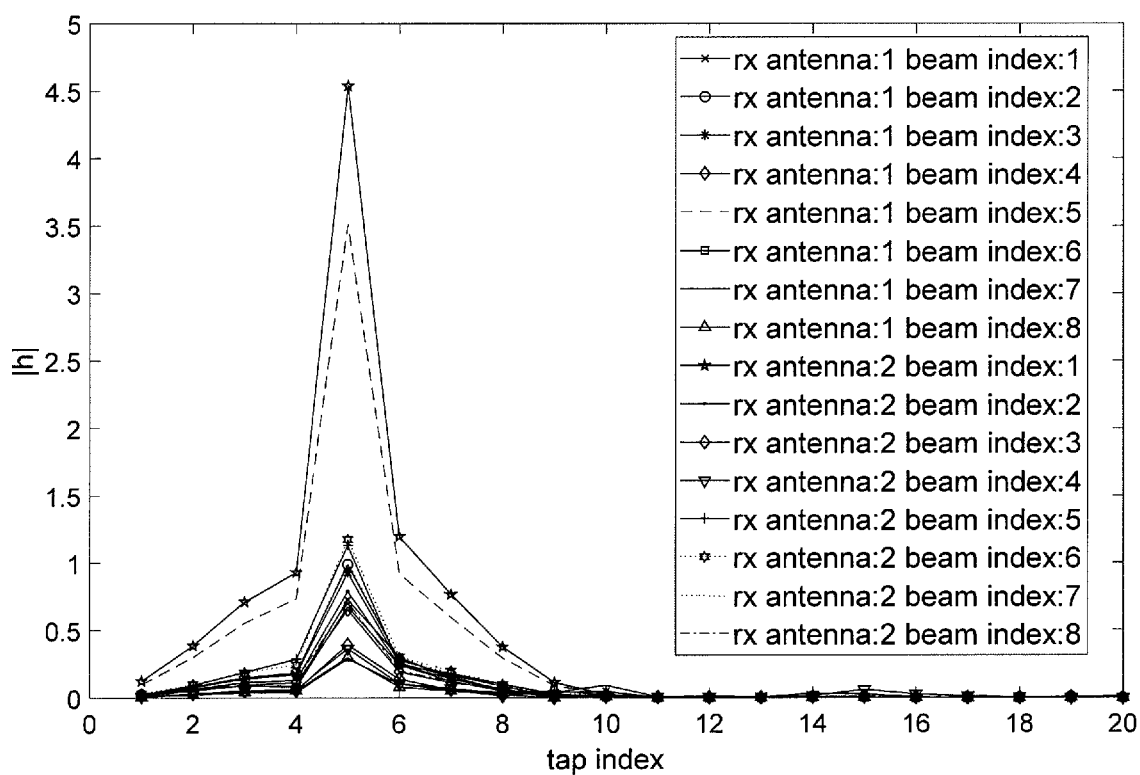
FIG. 4 is a graph of common channel support after channel aggregation, with channel tap magnitude |h| versus tap index.

As shown in FIG. 4, the common channel support assumption is still valid after $W_1$ aggregation and so we can exploit this property for signaling overhead reduction. Therefore, the significant taps of significant, meaning the ones which will be eventually fed back and not discarded, can be arranged in a time domain channel matrix as $$h^s_{NB \times N_s} = \begin{bmatrix} c_{1,1} & c_{1,N_s} \\ C_{NB,1} & C_{NB,N_s} \end{bmatrix} \quad (2)$$

assuming that the channel support constitutes $N_s$ locations.

Using this information, the idea is to convey the information of the tap locations in two steps. Step 1: send the locations of the channel support, namely, locations of $N_{si}$ columns out of $N_T$ columns in $h_{NB \times N_T}$, where this requires an overhead of $N_s \times \log_2 (N_T \times OS)$; effectively, narrowing down the possible locations to those in $h_{NB \times N_s}^s$, in Equation (2). Note that in the subscript the notation B.N instead of B×N is used so as not to confuse it by an array of three dimensions. Step 2: the tap locations of the $k_{taps}$ taps within $h_{NB \times N_s}^s$ are fed back but unlike the method explained earlier, because $N_s << N_T$, a bit mask (each entry has a binary value 0 or 1) can be sent with a size N×B×$N_s$. The total overhead from steps 1 and 2 is $$N_s \times \log_2(N_T \times OS) + N \times B \times N_s \quad (3)$$

An adequate value of $N_s$ was to be equal to $N_s=10$. Using this value in Equation (3), an overhead of 280 bits is required per UE (assuming the parameters in the discussion of FIG. 2, above), with a feedback periodicity results in a feedback rate of 5.6 kbps which is less than half that required with the baseline method.

Furthermore, the overhead in Equation (3) is independent of $k_{taps}$, i.e. no extra penalty on the tap location overhead from increasing the number of taps, unlike the feedback overhead using the baseline method.

The current invention, described herein, has exploited tempo-spatial properties for signalling overhead reduction for tap delays and their corresponding beams by a factor of two. Note that on top the used bit mask may be further compressed by existing state-of-the-art bit mask compression techniques In a first variation of this invention, UEs can be configured with predefined $N_s$ considering several aspects. Different UEs (depending on the UE location), experience different CIR lengths. Therefore, each UE can feedback to the gNB a recommended value of $N_s$. For example, UEs which are far from the gNB experience a long CIR and need a higher value of $N_s$. Depending on the UE category, different UEs have different values of $N_s$. Depending on the subcarrier spacing (or the numerology), UEs may have different $N_s$. To have sufficient channel state information and provide flexibility of different complexity levels for UE, maximum and/or minimum values can also be configured to the UE.

In a second variation of the invention, it may be worth sending at least L strongest taps per path. The remaining strongest taps can be conveyed via a bit mask. In more details, the feedback happens as follows in two steps. Note that there is a large number of taps; we pick only the highest in power (strongest) because they contain most of the energy. The rest can be ignored because they are small in power. A threshold to determine this distinction between strongest and ignorable can be heuristically chosen such as, for example, by a relative threshold in dB of the tap power compared to the strongest tap or, for another example, by a threshold on the MSE of the resulting channel frequency response after dropping of the insignificant taps. Moreover, another distinction, in addition to saying they are 'small in power' can be to say they don't carry any information.

In a first step, send the locations of the channel support, namely, locations of $N_s$ columns out of $N_T$ columns in $h_{NB \times N_T}$. Locations of the strongest L taps can be also indicated. This requires an overhead of $(N_s-L) \times \log_2 (N_T \times OS) + L.B.N \times \log_2 (N \times B \times N_T \times OS)$. In certain cases, gNB would know strongest L channels per path and feedback of that information can be removed.

In a second step, the tap locations of the $k_{taps}-L \times B \times N$ taps within $h_{NB \times N_T}^s$ is fed back. A bit mask (each entry has a binary value 0 or 1) can be sent of size $N \times B \times (N_s-L)$.

In this approach, the feedback periodicities of the channel support vector and the bit mask information can be different, since the information on the channel support vector is more slowly varying so it need not be updated as frequently. The value for L could be dependent on the UE category or configured via gNB.

In a third variation, for a multi-TRP case, when there is no full antenna (transmit beam) co-location, all the co-located antennas (transmit beams) could operate with the common channel support assumption, so we still could exploit partial co-locations of antenna subsets. For example, if the UE is connected to $N_{TRP}$ base stations, then for each base station the above procedure of feedback information is implemented.

Figure 5:
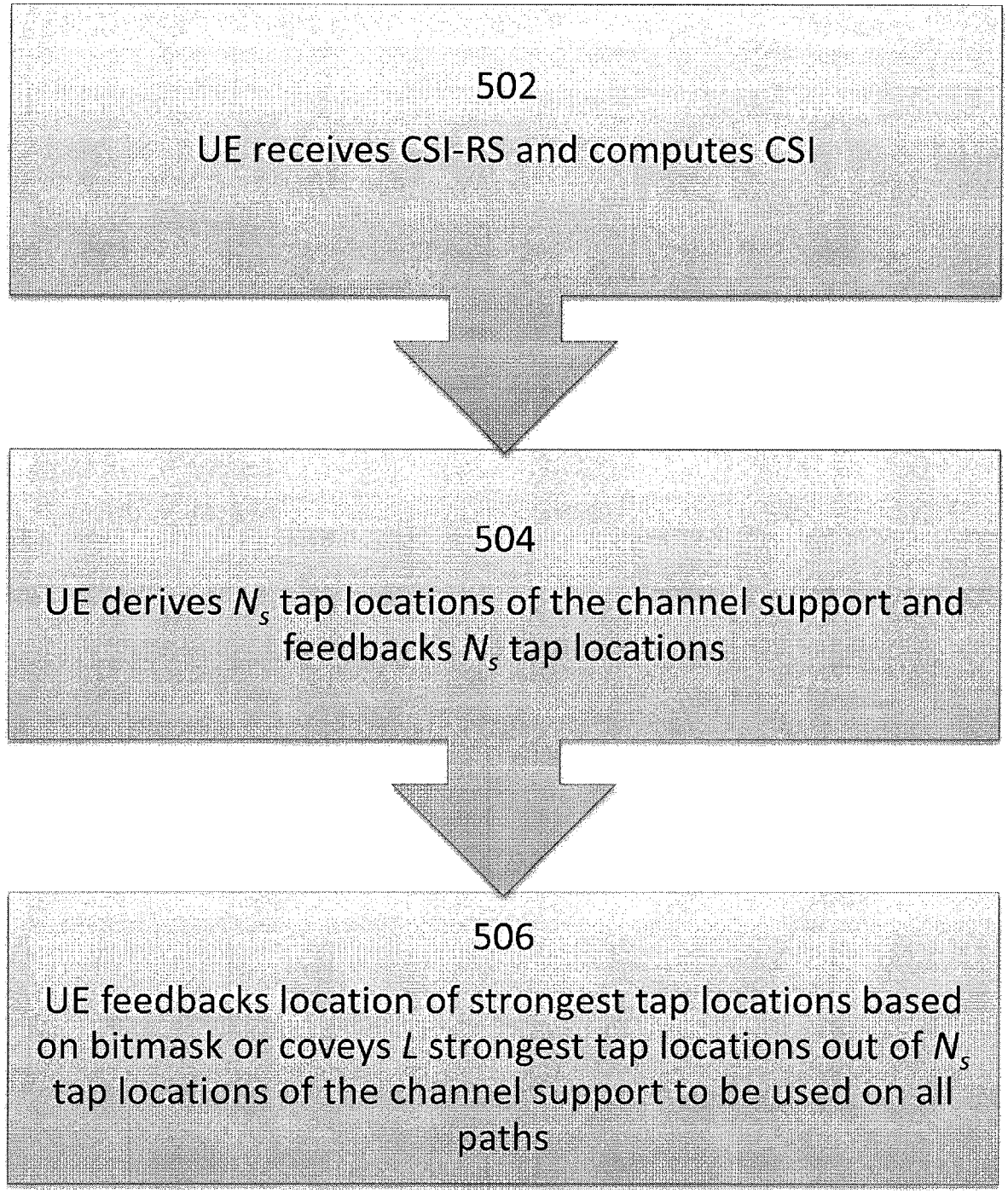
FIG. 5 is a logic flow diagram an exemplary method performed by a UE in, a result of execution of computer program instructions embodied on a computer readable memory, functions performed by logic implemented in hardware, and/or interconnected means for performing functions in accordance with exemplary embodiments.

FIG. 5 is a logic flow diagram an exemplary method performed by a UE, a result of execution of computer program instructions embodied on a computer readable memory, functions performed by logic implemented in hardware, and/or interconnected means for performing functions in accordance with exemplary embodiment.

In step 502, the UE receives the CSI-RS for CSI computation

With that information, in step 504, the UE derives $N_s$ tap locations of the channel support, depending on the observed channel and used subcarrier spacing and informs the locations of the $N_s$ taps of the channel support.

In step 506, the UE informs the locations of the strongest taps based on one of two ways. In a first way, the strongest taps may be conveyed via a bit mask. In a second way, the L strongest taps out of $N_s$ taps of the channel support are used on all paths and the remaining strongest taps are conveyed via a bit mask.

The BS can use the channel support information, locations of strongest taps, and amplitude and phase information (channel tap magnitude |h| and θ) to build the channel frequency response used in DL precoding, scheduling etc. In the time domain, the channel impulse response consists of complex coefficients. Each coefficient can be represented by a magnitude and a phase components (channel tap magnitude |h| and θ).

Information from steps 504 and 506 above may be transmitted in an independent or joint fashion, with different periodicities.

Information from steps 504 and 506 above can be considered as long term feedback. Information comprising amplitude and phase components of feedback channel taps (channel tap magnitude |h| and θ) is considered to be short term feedback Short term and long term feedback may be transmitted in periodic, aperiodic or semi-persistent way.

Short term and long term feedback may be transmitted in PUCCH and PUSCH, where short term feedback can be transmitted in PUCCH, long term feedback can be transmitted in PUSCH, or both short term and long term feedback can be transmitted in PUSCH.

Figure 6:
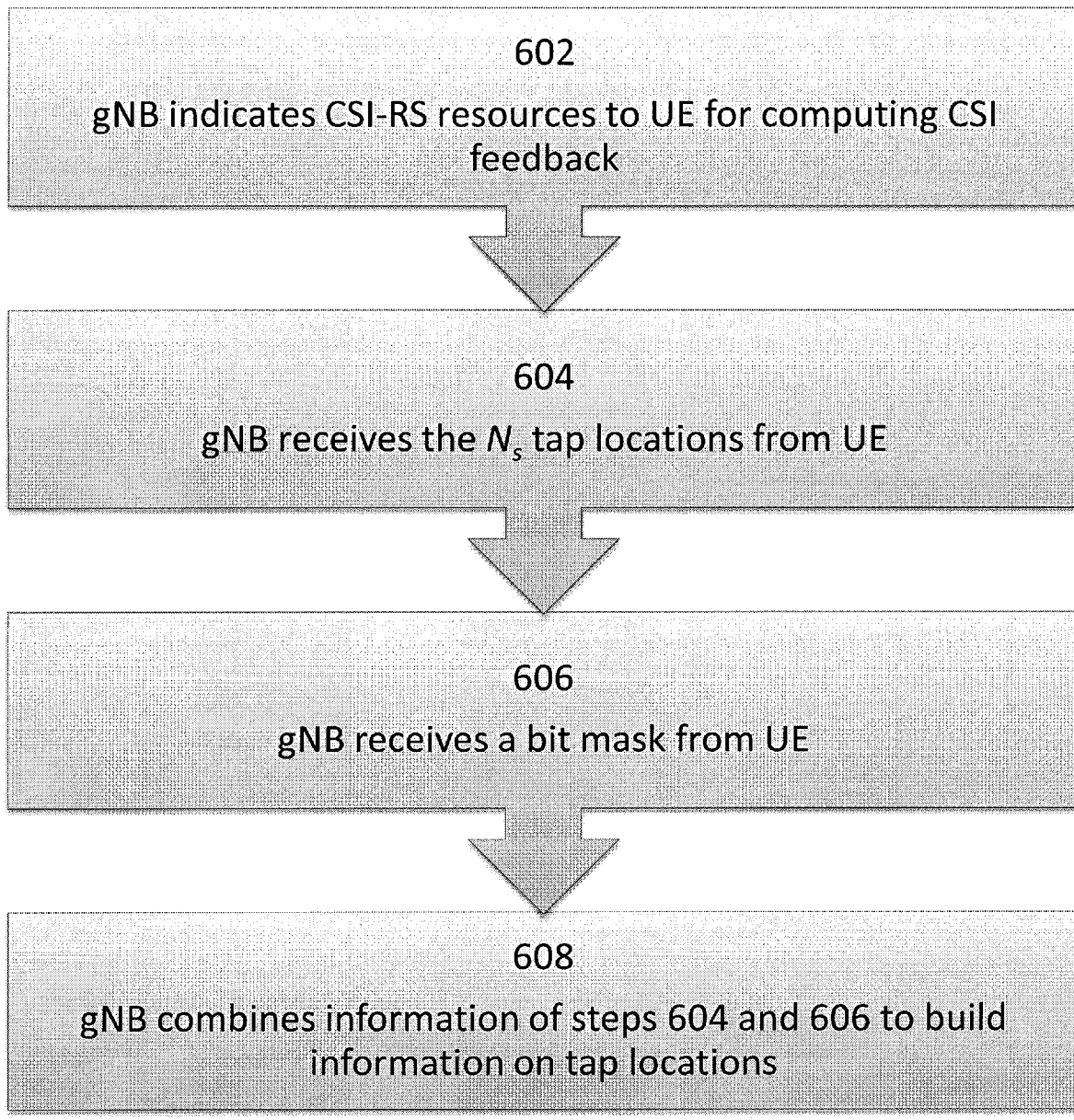
FIG. 6 is a logic flow diagram an exemplary method performed by a gNB, a result of execution of computer program instructions embodied on a computer readable memory, functions performed by logic implemented in hardware, and/or interconnected means for performing functions in accordance with exemplary embodiments.

FIG. 6 is a logic flow diagram an exemplary method performed by a gNB, a result of execution of computer program instructions embodied on a computer readable memory, functions performed by logic implemented in hardware, and/or interconnected means for performing functions in accordance with exemplary embodiment.

In step 602, the gNB indicates CSI-RS resources for computing CSI feedback, where the CSI-RS resources can be for one or multiple TRPs. In step 604, the gNB receives the $N_s$ tap locations. In step 606, the gNB receives bit mask from UE. In step 608, the gNB builds the gNB builds the information on tap location by combining the information from steps 604 and 608.

Figure 7:
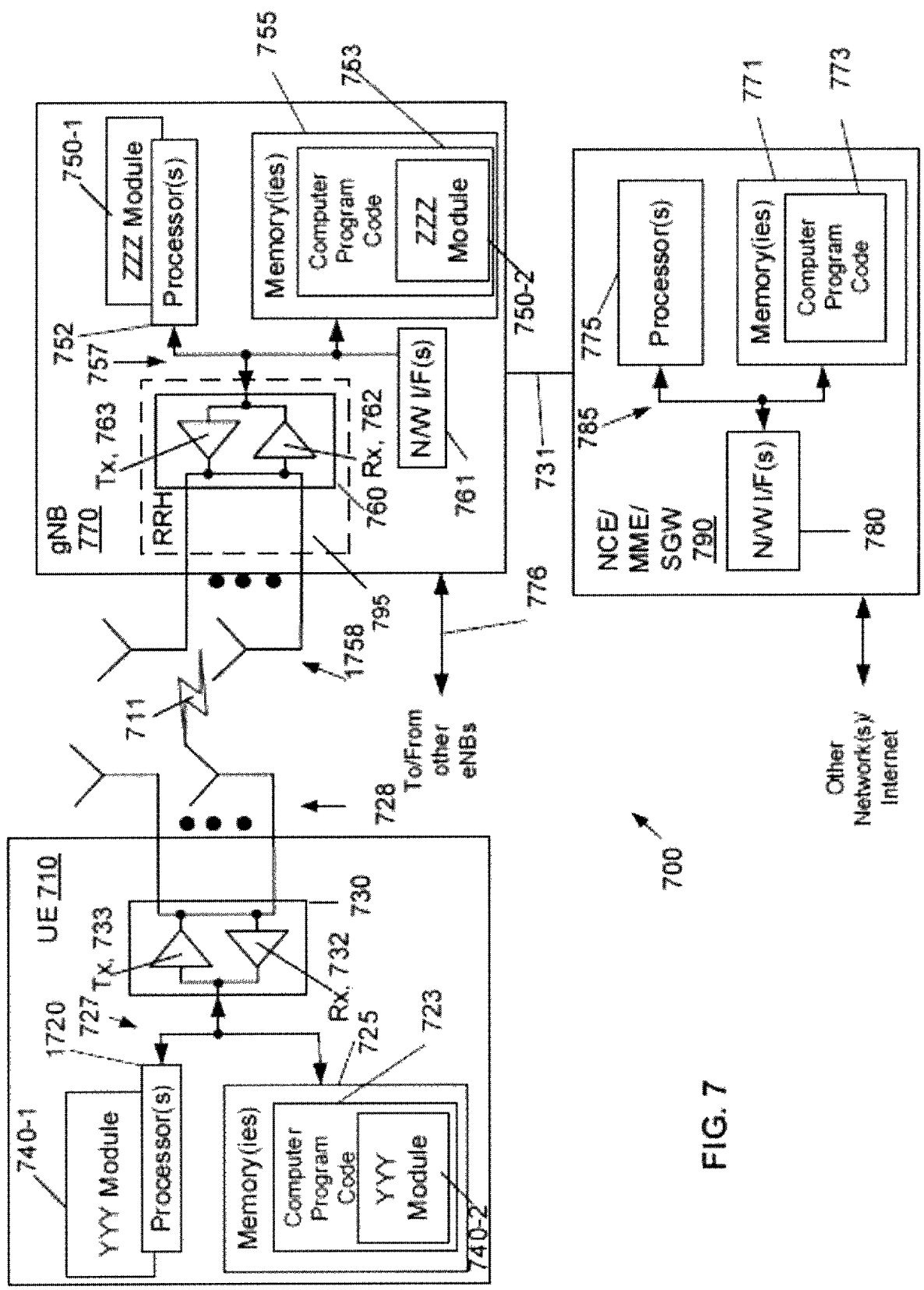
FIG. 7 is a block diagram of an exemplary system in which the exemplary embodiments may be practice.

FIG. 7 is presented showing a block diagram of one possible and non-limiting exemplary system in which the exemplary embodiments may be practiced. In FIG. 7, a user equipment (UE) 710 is in wireless communication with a wireless network 700. A UE is a wireless, typically mobile device that can access a wireless network. The UE 710 includes one or more processors 720, one or more memories 725, and one or more transceivers 730 interconnected through one or more buses 727. Each of the one or more transceivers 730 includes a receiver, Rx, 732 and a transmitter, Tx, 733. The one or more buses 727 may be address, data, or control buses, and may include any interconnection mechanism, such as a series of lines on a motherboard or integrated circuit, fiber optics or other optical communication equipment, and the like. The one or more transceivers 730 are connected to one or more antennas 728. The one or more memories 725 include computer program code 723. The UE 710 includes a YYY module 740, comprising one of or both parts 740-1 and/or 740-2, which may be implemented in a number of ways. The YYY module 740 may be implemented in hardware as YYY module 740-1, such as being implemented as part of the one or more processors 720. The YYY module 140-1 may be implemented also as an integrated circuit or through other hardware such as a programmable gate array. In another example, the YYY module 740 may be implemented as YYY module 740-2, which is implemented as computer program code 723 and is executed by the one or more processors 720. For instance, the one or more memories 725 and the computer program code 723 may be configured to, with the one or more processors 720, cause the user equipment 710 to perform one or more of the operations as described herein. The UE 710 communicates with base station 770 via a wireless link 711.

The base station 770 (which in the shown embodiment is a gNB or NR/5G Node B but possibly an evolved NodeB for LTE, long term evolution, but could be any similar access point to a wireless network) that provides access by wireless devices such as the UE 710 to the wireless network 100. The gNB 770 includes one or more processors 752, one or more memories 755, one or more network interfaces (N/W I/F(s)) 761, and one or more transceivers 760 interconnected through one or more buses 757. Each of the one or more transceivers 760 includes a receiver, Rx, 762 and a transmitter, Tx, 763. The one or more transceivers 760 are connected to one or more antennas 758. The one or more memories 755 include computer program code 753. The gNB 770 includes a ZZZ module 750, comprising one of or both parts 750-1 and/or 750-2, which may be implemented in a number of ways. The ZZZ module 750 may be implemented in hardware as ZZZ module 750-1, such as being implemented as part of the one or more processors 752. The ZZZ module 750-1 may be implemented also as an integrated circuit or through other hardware such as a programmable gate array. In another example, the ZZZ module 750 may be implemented as ZZZ module 750-2, which is implemented as computer program code 753 and is executed by the one or more processors 752. For instance, the one or more memories 755 and the computer program code 753 are configured to, with the one or more processors 752, cause the gNB 770 to perform one or more of the operations as described herein. The one or more network interfaces 761 communicate over a network such as via the links 776 and 731. Two or more gNBs 770 communicate using, e.g., link 776. The link 776 may be wired or wireless or both and may implement, e.g., an X2 interface.

The one or more buses 757 may be address, data, or control buses, and may include any interconnection mechanism, such as a series of lines on a motherboard or integrated circuit, fiber optics or other optical communication equipment, wireless channels, and the like. For example, the one or more transceivers 760 may be implemented as a remote radio head (RRH) 795, with the other elements of the gNB 770 being physically in a different location from the RRH, and the one or more buses 757 could be implemented in part as fiber optic cable to connect the other elements of the gNB 770 to the RRH 795.

It is noted that description herein indicates that "cells" perform functions, but it should be clear that the gNB that forms the cell would perform the functions. The cell makes up part of an gNB. That is, there can be multiple cells per gNB. For instance, there could be three cells for a single gNB carrier frequency and associated bandwidth, each cell covering one-third of a 360-degree area so that the single gNB's coverage area covers an approximate oval or circle. Furthermore, each cell can correspond to a single carrier and an gNB may use multiple carriers. So if there are three 120-degree cells per carrier and two carriers, then the gNB has a total of 6 cells.

The wireless network 700 may include a network control element (NCE) 790 that may include MME (Mobility Management Entity)/SGW (Serving Gateway) functionality, and which provides connectivity with a further network, such as a telephone network and/or a data communications network (e.g., the Internet). The gNB 770 is coupled via a link 731 to the NCE 790. The link 731 may be implemented as, e.g., an Si interface. The NCE 790 includes one or more processors 775, one or more memories 771, and one or more network interfaces (N/W PF(s)) 780, interconnected through one or more buses 785. The one or more memories 771 include computer program code 773. The one or more memories 771 and the computer program code 773 are configured to, with the one or more processors 775, cause the NCE 790 to perform one or more operations.

The wireless network 700 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 752 or 775 and memories 755 and 771, and also such virtualized entities create technical effects.

The computer readable memories 725, 755 and 771 may be of any type suitable to the local technical environment and may be implemented using any suitable data storage technology, such as semiconductor based memory devices, flash memory, magnetic memory devices and systems, optical memory devices and systems, fixed memory and removable memory. The processors 720, 752, and 775 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 710 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. For example, in an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, as in FIG. 7 for example. A computer-readable medium may comprise a computer-readable storage medium (e.g., memories 725, 755, 771 or other device) that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

Figure 8:
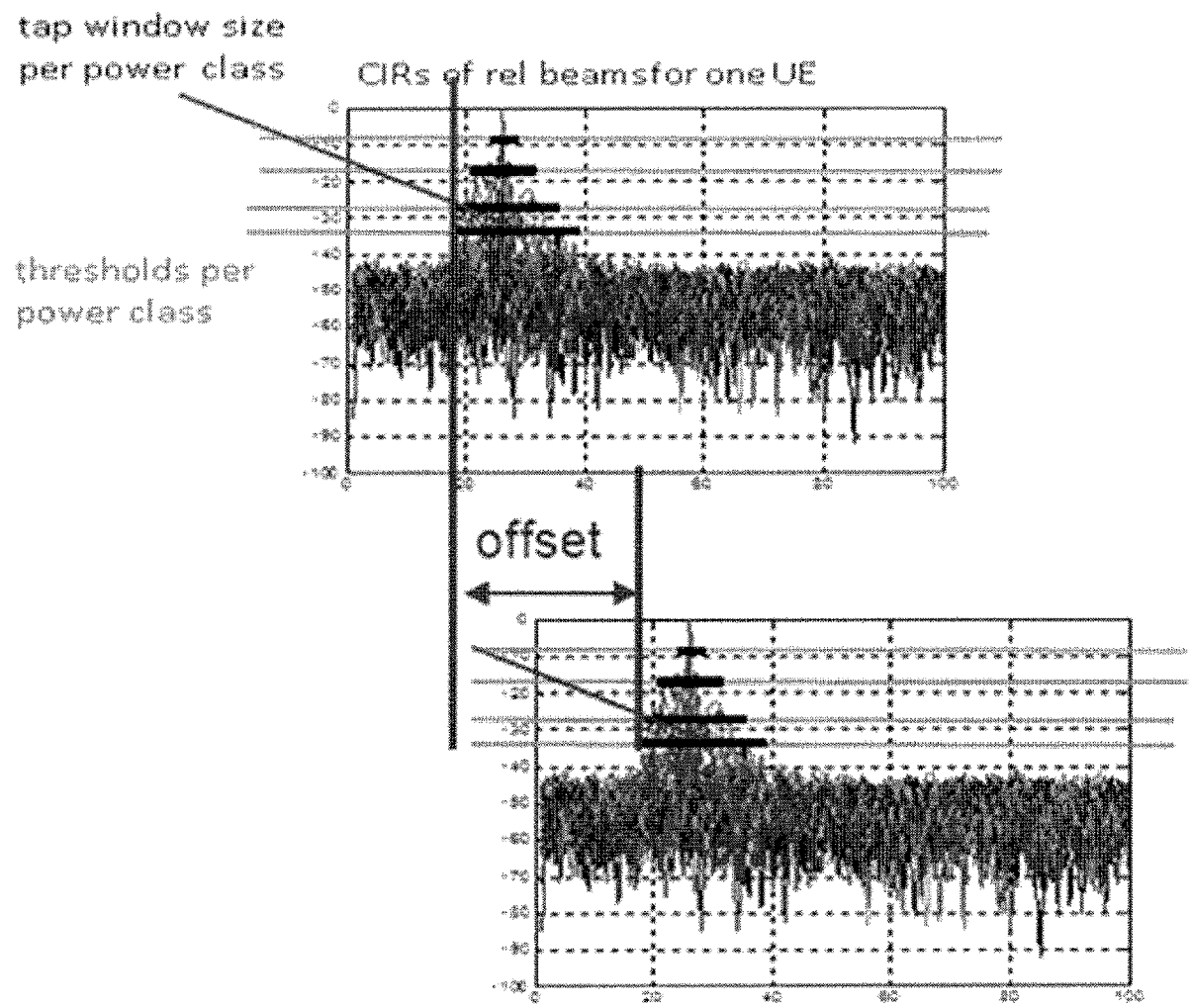
FIG. 8 is a a graph of thresholds per power class versus CIRs of relative beams for one UE, where tap window size per power class can be gleaned.

Turning to FIG. 8, which shows a graph of a windowing solution with power classes and offset reporting, brings us to a fourth variation. In FIG. 8, the x-axis contains the tap IDs and y-axis the relative Rx-power per tap. The various forms that make up the graph need not be distinguished here individually for purposes of replicating it, but nonetheless indicate different CIRs for different relevant beams as the outcome of an urban macro (UMa) system level simulation. The black horizontal lines are the proposed power class dependent window sizes, once reported for all CIRs of all beams.

From FIG. 8 one can observe the way the power class dependent window sizes are defined:

(i) in a first step the power classes are being defined either by RRC control messages or as fixed standardized relative power threshold values such as [−6−12−18−24] dB. The relative power values are then power threshold values with respect to the strongest tap of the CIR. All taps with a strength in the power window of −6 to 0 dB relative to the strongest tap belong then to the strongest power class $P_1$, all taps between −12 to −6 dB to power class $P_2$, and so on;

(ii) having sorted taps to their power classes $P_i$ one can set up the according power class dependent window sizes $w(P_i)$ by finding the smallest window size covering all relevant taps for that power class.

Note, choosing [−6−12−18−24] dB as threshold values for power classes $P_1$ to $P_4$ seems to be a natural choice as one can then directly reduce per power class the number of bits for the amplitude values (short term CSI feedback) by one bit without losing any information. Also please note, the most significant amplitude bits will be in this case always '0', '00' or '000' and can be therefore omitted. The number of bits for the short term phase information can be reduced in a similar manner.

The window offset values are then defined—typically—relative to the window start value for the strongest power class window. It defines the offsets of the lower power class windows start values with respect to the strongest window start value in number of taps. These offset values might be quantized for example as $N_{off}(k)=2^k$, k∈N. Note, these offset values ensure that one can use always the shortest window size per power class as otherwise all windows would have to start from the same tap, defined by the start tap of the largest window size.

In the first variation described herein above, the number of channel support locations $N_s$ is adapted to the CIR length. This approach can be extended to a windowing solution according to FIG. 8, and as explained above, where the black horizontal lines indicate the widowing functionality for the given CIRs. The CIRs have typically an exponential decay for the Rx power of the taps, so that there are few high power taps while the number of lower power taps might be larger. This is reflected by accordingly increasing window sizes, where the window size per power class defines accordingly the length of the bitmaps for the relevant taps falling in this power class. The window size will be quantized as well and might be either adapted per UE for all beams or individually per beam. Note as well, this includes the case of a single power class for all relevant taps.

The UEs report first a window size from a predefined set of possible window sizes, such as window length $N_w=4, 8, 16, 32, 64 \ldots$ taps. In that way the reporting for the support locations can be reduced from $N_s \times \log_2(N_T \times OS)$ to $N_s \times \log_2(N_w \times OS) + N_{sel} = 2 \ldots 3$ bit for the window size selection. For small values such as $N_W=16$ the reporting overhead would accordingly be almost halved.

Specifically, the combination of windowing and $N_s$ is here that the window size reduces the number of possible tap locations for the common channel support taps. Therefore, the reporting of the $N_s$ tap locations can be done more efficiently with lower number of bits per significant tap location, i.e., with $\log_2(N_W \times OS)$ instead of $\log_2(N_T \times OS)$ bits. If for example $N_T=256$ and $N_W=16$, then $\log_2(N_T)=8$ and $\log_2(N_w)=4$ bits, i.e., one saves 4 times $N_s$ bits due to windowing.

Different CIRs will have different taps from the overall set of $N_s$ taps in different power classes. As $N_S$ is typical small the down selection of relevant taps per CIR and power class can be done in a next step by a bitmap of length $N_S(w)$, where $N_S(w)$ means those common support taps falling into the regarded window size of $w_i$.

The purpose of power class specific window sizes is to reduce the overhead for explicit CSI short term reporting. For predefined power classes the quantization of the related short term reports of explicit CSI feedback per relevant taps can be adapted to the strength of these taps. Lower power taps can use coarser quantization compared to that for the taps of the stronger power classes. That way the effective reporting error due to quantization remains similar for all taps.

It is being assumed that there is an implicit binding of quantization to power classes so that any further control signaling regarding tap quantization can be avoided. Note, this implicit binding might be predefined or adapted by RRC control messages.

The relevant channel components have often a quite similar length of their CIR for the same site, which can be seen as another common support assumption, which is related mainly to the scenario as well as the relative distances of the cooperating sites.

In case of multiple transmission TRPs at different locations, there will be likely a common relative delay between the CIRs from different cells or sites. For that reason, it is proposed to add a relative window offset value $N_{off}$ for different sites and then to use again the shortest possible window length per site. Note, similar these relative window offset values can be used to identify the offsets of windows from different power classes.

In case of multi TRP the number of relevant beams received above a certain power threshold might become quite high. Here another common channel support can be exploited, i.e., the similar Rx-power strength of beams from same sites or cells, mainly due to similar gNB UE distances for all beams of a site.

Therefore, it might be worth to first identify the sites containing relevant beams and then identify those related to the active sites the active cells with relevant beams. The UEs report then only for the active cells, for instance, bitmaps for identification of the active beams of these cells. The reporting accordingly is then [site1 site2 site3] [cell1 cell2 cell3|cell4 cell5 cell6|cell7 cell8 cell9]] [b1 ... b32|b1 ... b32| ... b1 ... b32], where each [site], [cell] or bit [$b_{xx}$] is either '1' or '0', namely, either active or not. In case a site is set to '0' or inactive, then the cells accordingly do not have to be reported anymore and, more specifically, the reporting for the related beams to those cells can be omitted as well. For example, assuming there are three active cells from 2 different sites with 5 relevant beams per cell=15 beams overall, then the reporting overhead would be: 3 bits (for active sites)+6 bit (for active cells of 2 active sites)+3 (cells)*5 (beams)*5 bit (beam ID=log(32)). That is, in this example the reporting would be overall 45 bits instead of a bitmap with 288 bits or alternatively 15*log(288)=15*9=135 bit. Note, in this example the 288 beams would be for a cooperation area over three sites with three cells per site and 32 beams per cell=3×3×32=288.

Regarding the number of bits the 288 bits would be useful for future CoMP scenarios as defined for example in the EU funded project Fantastic5G. For a simple bitmap approach one would need a length 288 bitmap for 288 possible beams, where 288 beams are the result from 3 sites times 3 cells times 32 beams per cell.

This fourth variation could be expressed in two different configurations. In the first configuration, an exemplary method would follow the progression of FIG. 5 for the UE and FIG. 6 for the gNB, except that in steps 504 and 506. In step 506, where under the earlier variations the UE directly derives the $N_s$ tap locations of the channel support, for the first configuration of the fourth variation, the derivation of the $N_s$ tap locations of the channel support involves first the UE deriving window size and then thereafter deriving the $N_s$ tap locations of the channel support relative to window size. In other words, step 504 for the first configuration of the fourth variation could be read as the UE derives window size and, relative to the window size, the $N_s$ tap locations of the channel support. In step 506, in this first configuration of the fourth variation, the UE would feedback the location of strongest taps based on bitmask.

The second configuration of the fourth variation differs a bit more from the other variations because it brings the concept of power class as described herein above into the exemplary methods for both the UE and gNB. For this we turn to FIG. 9 for an exemplary method for the UE and FIG. 10 for an exemplary method for the gNB.

Figure 9:
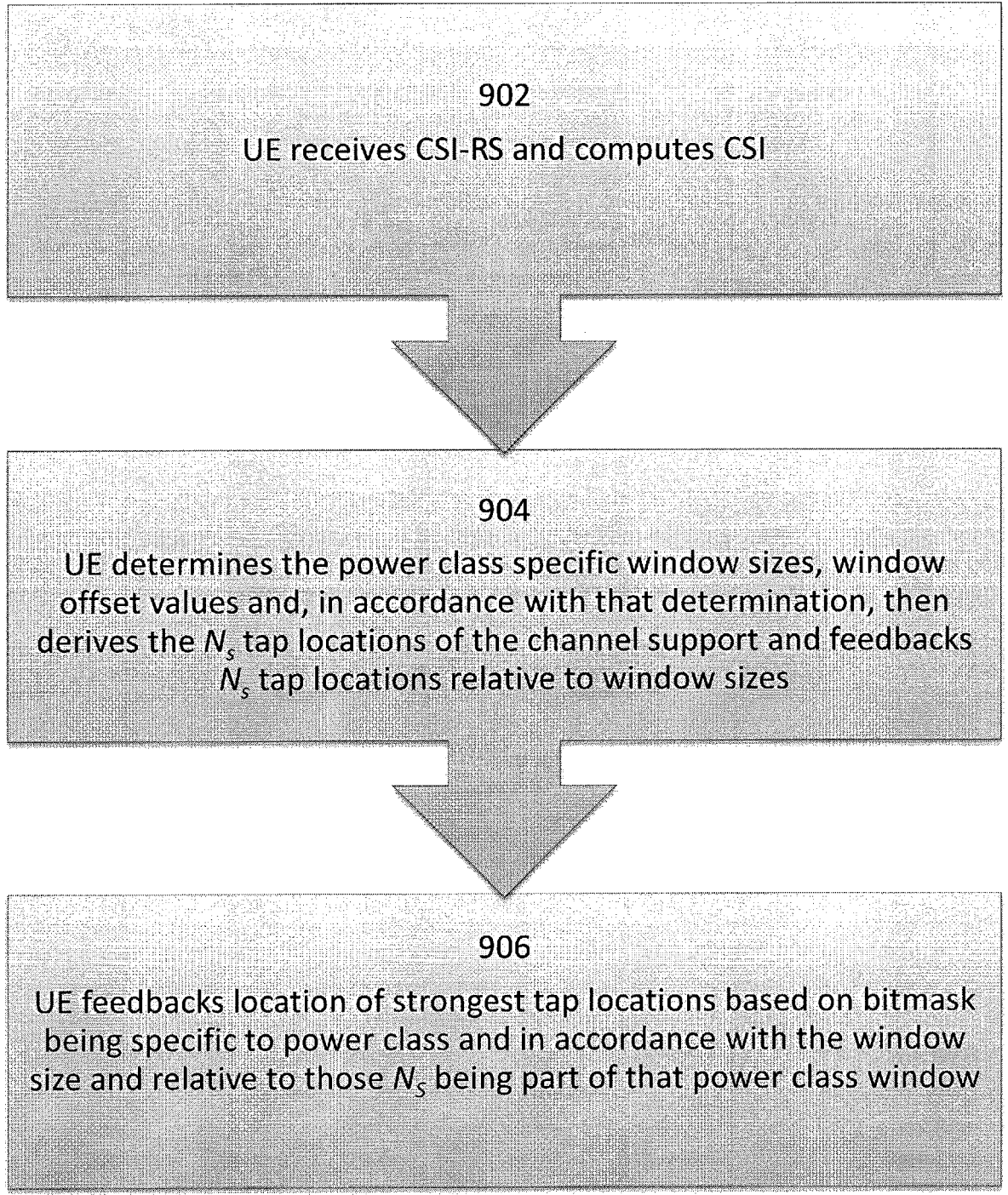
FIG. 9 is a logic flow diagram an exemplary method performed by a UE in, a result of execution of computer program instructions embodied on a computer readable memory, functions performed by logic implemented in hardware, and/or interconnected means for performing functions in accordance with another configuration of exemplary embodiments.

FIG. 9 is a logic flow diagram an exemplary method specific to the second configuration of the fourth variation of the invention as performed by a UE, which is a result of execution of computer program instructions embodied on a computer readable memory, functions performed by logic implemented in hardware, and/or interconnected means for performing functions in accordance with exemplary embodiment.

In step 902, the UE receives the CSI-RS for CSI computation

With that information, in step 904, the UE determines the power class specific window sizes, window offset values and then accordingly derives $N_s$ tap locations of the channel support, depending on the observed channel and used subcarrier spacing and informs the locations of the $N_s$ taps of the channel support relative to window sizes.

In step 906, the UE informs the locations of the strongest taps based on one of two ways. In a first way, the strongest taps may be conveyed via a bit mask being specific to power class and according window size and relative to those $N_s$ being part of that power class window.

To be more specific regarding power class specific tap reporting, let's start with the set $S_{full}$ containing all $N_s$ common support taps $\{ts_{full}\}$. This set is equivalently to the significant taps of the lowest power class having the largest window size $w_4$, i.e. $w(P_4)$.

Under the general assumption that the window sizes $w(P_1<P_4)$ for lower power classes will be smaller, i.e., $w_i<=w_4$, then the union set of $S_{full}$ and $Sw_i$ will be a subset of $S_{full}$. Here $Sw_i$ is the set of all taps being part of window $w(P_i)$. Accordingly, it is sufficient to report for the windows $w_i$ related to the power classes $P_i$ only a smaller sub set of potential relevant taps $\{t_i\}$.

Figure 10:
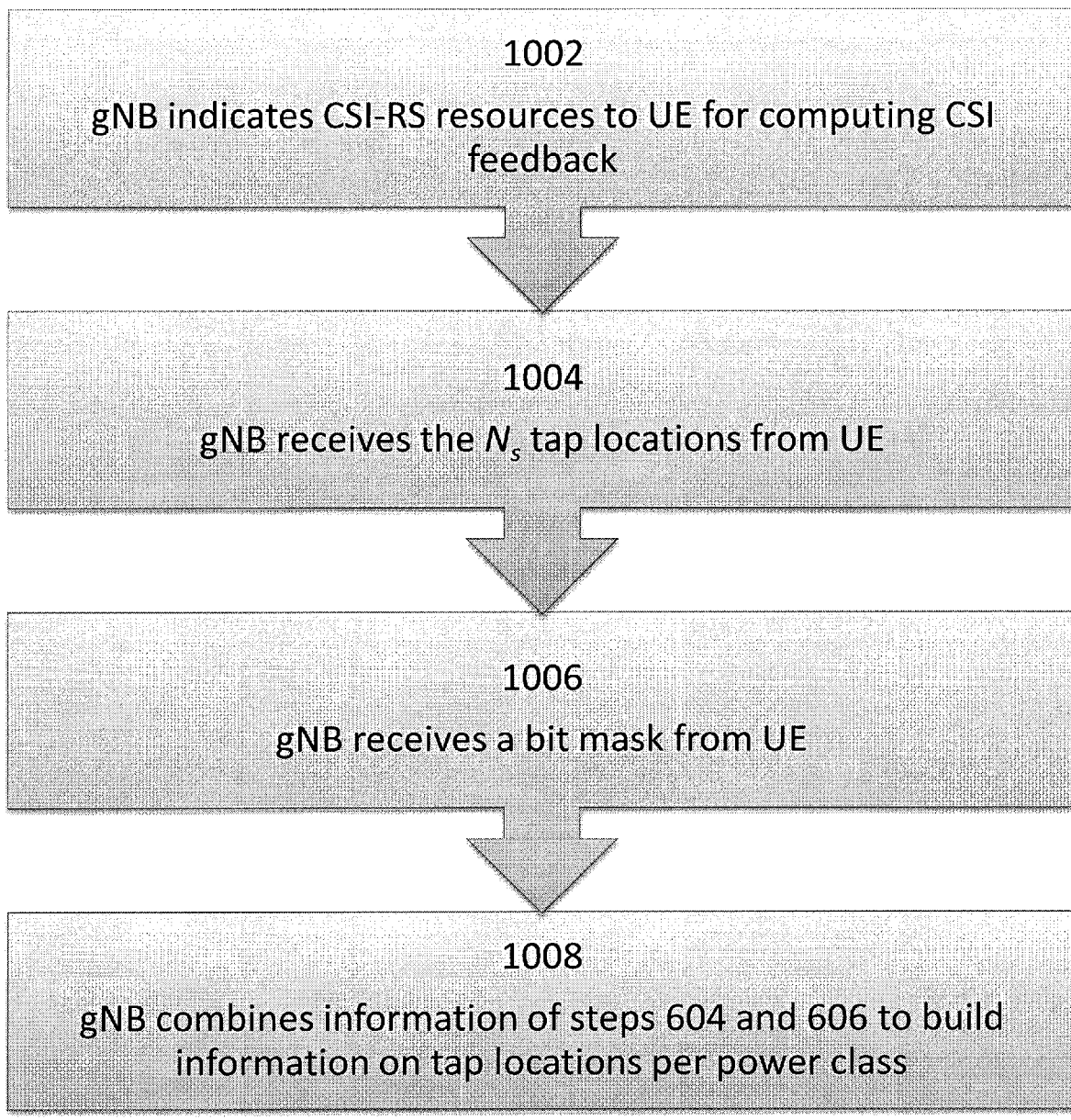
FIG. 10 is a logic flow diagram an exemplary method performed by a gNB, a result of execution of computer program instructions embodied on a computer readable memory, functions performed by logic implemented in hardware, and/or interconnected means for performing functions in accordance with another configuration of exemplary embodiments.

FIG. 10 is a logic flow diagram an exemplary method specific to the second configuration of the fourth variation of the invention as performed by a gNB, which is a result of execution of computer program instructions embodied on a computer readable memory, functions performed by logic implemented in hardware, and/or interconnected means for performing functions in accordance with exemplary embodiment. This exemplary method is almost identical to the exemplary method of FIG. 6, except that in addition to the gNB combining the information of steps 1004 and 1006 (similar to 604 and 606) to build information on tap locations, these the information on the tap locations is per power class.

As can be seen from the reciprocal steps between FIG. 5 and FIG. 6 and between FIG. 9 and FIG. 10, the actions of the UE and gNB react to the sending and/or receiving of one to the other.

Although various aspects of the invention are set out in the independent claims, other aspects of the invention comprise other combinations of features from the described embodiments and/or the dependent claims with the features of the independent claims, and not solely the combinations explicitly set out in the claims.

Without in any way limiting the scope, interpretation, or application of the claims appearing below, an advantage or technical effect of one or more of the exemplary embodiments disclosed herein is improving spectral efficiency of the system for a given feedback rate and/or reducing the overall feedback overhead for NR MIMO and mMIMO systems.

A further advantage or technical effect of one or more of the exemplary embodiments disclosed herein is that for high load scenarios the CSI reporting overhead is reduced as far as possible with minimum performance degradations.

Reporting of irrelevance is minimized by the reporting of relevant taps per power class and window size, ideally adapted to the characteristics of the CIR of each beam. Especially, the quantization per power class avoids high overhead for low power taps.

A further advantage or technical effect of one or more of the exemplary embodiments disclosed herein is that for low load scenarios the CSI reporting can be reduced as far as possible by accepting some performance degradations. For that purpose, one can limit reporting to the relevant taps of the higher power classes. Despite the lower overhead the explicit feedback per relevant channel component allows to overcome inter user interference comparably better than with PMI feedback.

A further advantage or technical effect of one or more of the exemplary embodiments disclosed herein is that reporting of short term CSI relative to relevant channel components and relevant taps—being semi-statically updated—is beneficial for large data packet sizes with PDSCHs spanning over multiple TTIs. For startup or short data packets one may introduce a slow start, where in the first TTI only a roughly quantized part of the full information is being provided, e.g., only the high power class relevant tap CSI information.

An example of an embodiment of the current invention, which can be referred to as item 1, is a method that comprises receiving, by a user equipment, channel state information reference signal; computing channel support information; deriving, based on the channel state information, $N_s$ tap locations of channel support, depending on the observed channel and used subcarrier spacing, wherein $N_s$ tap locations is a subset of all tap locations present; apprising a base station of the $N_s$ tap locations of the channel support; and informing the base station of strongest tap locations, for use in building a channel frequency response.

An example of an additional embodiment of the current invention, which can be referred to as item 2, is the method of item 1, wherein the informing is based on conveying the strongest tap locations via a bit mask.

An example of an additional embodiment of the current invention, which can be referred to as item 3, is the method of any preceding item, wherein the informing is based on using L strongest tap locations out of the $N_s$ tap locations of the channel support on all paths and conveying any remaining strongest tap locations via a bit mask.

An example of an additional embodiment of the current invention, which can be referred to as item 4, is the method of any preceding item, wherein the apprising and/or the informing are performed in an independent or joint fashion, wherein the performing can be with different periodicities.

An example of an additional embodiment of the current invention, which can be referred to as item 5, is the method of any preceding item, wherein short term feedback and/or long term feedback are transmitted in periodic, aperiodic, or semi-persistent way.

An example of an additional embodiment of the current invention, which can be referred to as item 6, is the method of any preceding item, wherein short term and long term feedback may be transmitted in physical uplink control channel and physical uplink shared channel, such that short term feedback can be transmitted in physical uplink control channel, long term feedback can be transmitted in physical uplink shared channel, or short term and long term feedback can be transmitted in physical uplink shared channel.

An example of an additional embodiment of the current invention, which can be referred to as item 7, is the method of any preceding item, wherein information transferred via the apprising and/or the informing is considered long-term feedback.

An example of an additional embodiment of the current invention, which can be referred to as item 8, is the method of item 2, wherein prior to the deriving, determining window size, and wherein the deriving is done in relation to the determined window size.

An example of an additional embodiment of the current invention, which can be referred to as item 9, is the method of item 2, wherein prior to the deriving, determining power class specific window sizes and window offset values, wherein the deriving is done in accordance with the determined power class specific window sizes and window offset values, wherein the locations are relative to window sizes, and wherein the bit mask is specific to power class and according window size and relative to those $N_s$ tap locations being part of the power class window.

An example of an embodiment of the current invention, which can be referred to as item 10, is a method that comprises indicating, by a base station to a user equipment, channel state information reference signal resources for computing channel state information feedback, where the channel state information reference signal resources can be for one or multiple transmit receive points; receiving, by the base station from the user equipment, an indication of $N_s$ tap locations and a bit mask; and building, by the base station, information on tap locations by combining the received indication and bit mask.

An example of an additional embodiment of the current invention, which can be referred to as item 11, is the method of item 10, wherein the bit mask is a plurality of bit masks, and wherein the building is per power class.

An example of an additional embodiment of the current invention, which can be referred to as item 12, is a computer program comprising code for performing the method of any of the preceding items.

An example of an embodiment of the current invention, which can be referred to as item 13, is a computer program that comprises code for receiving, by a user equipment, channel state information reference signal; code for computing channel support information; code for deriving, based on the channel state information, $N_s$ tap locations of channel support, depending on the observed channel and used subcarrier spacing, wherein $N_s$ tap locations is a subset of all tap locations present; code for apprising a base station of the $N_s$ tap locations of the channel support; and code for informing the base station of strongest tap locations, for use in building a channel frequency response.

An example of a further embodiment of the current invention, which can be referred to as item 14, is a computer program that comprises code for indicating, by a base station to a user equipment, channel state information reference signal resources for computing channel state information feedback, where the channel state information reference signal resources can be for one or multiple transmit receive points code for receiving, by the base station from the user equipment, an indication of N tap locations and a bit mask; and code for building, by the base station, information on tap locations by combining the received indication and bit mask.

An example of an additional embodiment of the current invention, which can be referred to as item 15, is the computer program code of items 12 through 14, where the code is comprising in a computer-readable storage medium for use with a computer.

An example of a further embodiment of the current invention, which can be referred to as item 16, is a computer program product embodied on a non-transitory computer-readable medium in which a computer program is stored that, when being executed by a computer, is configured to provide instructions with code to control or carry out: receiving, by a user equipment, channel state information reference signal; computing channel support information; deriving, based on the channel state information, $N_s$ tap locations of channel support, depending on the observed channel and used subcarrier spacing, wherein $N_s$ tap locations is a subset of all tap locations present; apprising a base station of the $N_s$ tap locations of the channel support; and informing the base station of strongest tap locations, for use in building a channel frequency response.

An example of a further embodiment of the current invention, which can be referred to as item 17, is a computer program product embodied on a non-transitory computer-readable medium in which a computer program is stored that, when being executed by a computer, is configured to provide instructions with code to control or carry out: indicating, by a base station to a user equipment, channel state information reference signal resources for computing channel state information feedback, where the channel state information reference signal resources can be for one or multiple transmit receive points receiving, by the base station from the user equipment, an indication of $N_s$ tap locations and a bit mask; and building, by the base station, information on tap locations by combining the received indication and bit mask.

An example of another embodiment of the current invention, which can be referred to as item 18, is an apparatus that comprises means for receiving channel state information reference signal; means for computing channel support information; means for deriving, based on the channel state information, $N_s$ tap locations of channel support, depending on the observed channel and used subcarrier spacing, wherein $N_s$ tap locations is a subset of all tap locations present; means for apprising a base station of the $N_s$ tap locations of the channel support; and means for informing the base station of strongest tap locations, for use in building a channel frequency response.

An example of an additional embodiment of the current invention, which can be referred to as item 19, is the apparatus of item 18, wherein the informing is based on conveying the strongest tap locations via a bit mask.

An example of an additional embodiment of the current invention, which can be referred to as item 20, is the apparatus of item 18 or 19, wherein the informing is based on using L strongest tap locations out of the $N_s$ tap locations of the channel support on all paths and conveying any remaining strongest tap locations via a bit mask.

An example of an additional embodiment of the current invention, which can be referred to as item 21, is the apparatus of any of items 18 through 20, wherein the apprising and/or the informing are performed in an independent or joint fashion, wherein the performing can be with different periodicities.

An example of an additional embodiment of the current invention, which can be referred to as item 22, is the apparatus of items 18 through 21, wherein short term feedback and/or long term feedback are transmitted in periodic, aperiodic, or semi-persistent way.

An example of an additional embodiment of the current invention, which can be referred to as item 23, is the apparatus of items 18 through 22, wherein short term and long term feedback may be transmitted in physical uplink control channel and physical uplink shared channel, such that short term feedback can be transmitted in physical uplink control channel, long term feedback can be transmitted in physical uplink shared channel, or short term and long term feedback can be transmitted in physical uplink shared channel.

An example of an additional embodiment of the current invention, which can be referred to as item 24, is the apparatus of any of items 18 through 23, wherein information transferred via the apprising and/or the informing is considered long-term feedback.

An example of an additional embodiment of the current invention, which can be referred to as item 25, is the apparatus of item 19, wherein prior to the deriving, determining window size, and wherein the deriving is done in relation to the determined window size.

An example of an additional embodiment of the current invention, which can be referred to as item 26, is the apparatus of item 19, wherein prior to the deriving, determining power class specific window sizes and window offset values, wherein the deriving is done in accordance with the determined power class specific window sizes and window offset values, wherein the locations are relative to window sizes, and wherein the bit mask is specific to power class and according window size and relative to those $N_s$ tap locations being part of the power class window.

An example of another embodiment of the current invention, which can be referred to as item 27, is an apparatus that comprises means for indicating, to a user equipment, channel state information reference signal resources for computing channel state information feedback, where the channel state information reference signal resources can be for one or multiple transmit receive points; means for receiving, from the user equipment, an indication of $N_s$ tap locations and a bit mask; and means for building information on tap locations by combining the received indication and bit mask.

An example of an additional embodiment of the current invention, which can be referred to as item 28, is the apparatus of item 27, wherein the bit mask is a plurality of bit masks, and wherein the building is per power class.

An example of another embodiment of the current invention, which can be referred to as item 29, is an apparatus that comprises at least one processor and at least one memory including computer program code, wherein the at least one memory and the computer code are configured, with the at least one processor, to cause the apparatus to at least perform the following: receiving channel state information reference signal; computing channel support information; deriving, based on the channel state information, $N_s$ tap locations of channel support, depending on the observed channel and used subcarrier spacing, wherein $N_s$ tap locations is a subset of all tap locations present; apprising a base station of the $N_s$ tap locations of the channel support; and informing the base station of strongest tap locations, for use in building a channel frequency response.

An example of another embodiment of the current invention, which can be referred to as item 30, is an apparatus that comprises at least one processor and at least one memory including computer program code, wherein the at least one memory and the computer code are configured, with the at least one processor, to cause the apparatus to at least perform the following: indicating, to a user equipment, channel state information reference signal resources for computing channel state information feedback, where the channel state information reference signal resources can be for one or multiple transmit receive points; receiving, from the user equipment, an indication of $N_s$ tap locations and a bit mask; and building information on tap locations by combining the received indication and bit mask.

Although various aspects are set out above, other aspects comprise other combinations of features from the described embodiments, and not solely the combinations described above. If desired, the different functions discussed herein may be performed in a different order and/or concurrently with each other. Furthermore, if desired, one or more of the above-described functions may be optional or may be combined. Please note that the use of the word "taps" has been used on occasion herein instead of "tap locations" to mean the same thing.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes examples of embodiments of the invention, these descriptions should not be viewed in a limiting sense. Rather, there are several variations and modifications which may be made without departing from the scope of the present invention as defined in the appended claims.

What is claimed is:

1. A method comprising:
receiving, by a user equipment, a channel state information reference signal;
computing channel support information;
deriving, based on the channel state information, $N_s$ tap locations of channel support, depending on the observed channel and used subcarrier spacing, wherein $N_s$ tap locations is a subset of all tap locations present;
apprising a base station of the Ns tap locations of the channel support;
informing the base station of strongest tap locations, for use in building a channel frequency response, wherein the informing is based on conveying the strongest tap locations via a bit mask; and
determining, prior to the deriving, power class specific window sizes and window offset values,
wherein the deriving is performed in accordance with the determined power class specific window sizes and window offset values,
wherein the tap locations are relative to window sizes, and
wherein the bit mask is specific to a power class specific window size, which corresponds to the strongest tap locations, of the determined power class specific window sizes.

2. The method of claim 1, wherein the informing is based on using L strongest tap locations out of the $N_s$ tap locations of the channel support on all paths and conveying any remaining strongest tap locations via the bit mask.

3. The method of claim 1, wherein transmitting information from the apprising and/or the informing is performed in an independent or joint fashion, wherein the transmitting for the apprising and transmitting for the informing are performed with different periodicities.

4. The method of claim 1, wherein information of tap locations transferred via the apprising and/or the informing is considered long-term feedback.

5. A computer program product embodied on a non-transitory computer-readable medium in which a computer program is stored that, when being executed by a computer, is configured to provide instructions with code to control or carry out:

receiving, by a user equipment, channel state information reference signal; computing channel support information;
deriving, based on the channel state information, $N_s$ tap locations of channel support, depending on the observed channel and used subcarrier spacing, wherein $N_s$ tap locations is a subset of all tap locations present;
apprising a base station of the $N_s$ tap locations of the channel support;
informing the base station of strongest tap locations, for use in building a channel frequency response, wherein the informing is based on conveying the strongest tap locations via a bit mask; and
determining, prior to the deriving, power class specific window sizes and window offset values,
wherein the deriving is performed in accordance with the determined power class specific window sizes and window offset values,
wherein the tap locations are relative to window sizes, and
wherein the bit mask is specific to a power class specific window size, which corresponds to the strongest tap locations, of the determined power class specific window sizes.

6. The computer program product of claim 5, wherein the informing is based on using L strongest tap locations out of the $N_s$ tap locations of the channel support on all paths and conveying any remaining strongest tap locations via the bit mask.

7. The computer program product of claim 5, wherein transmitting information from the apprising and/or the informing is performed in an independent or joint fashion, wherein the transmitting for the apprising and transmitting for the informing are performed with different periodicities.

8. The computer program product of claim 5, wherein information of tap locations transferred via the apprising and/or the informing is considered long-term feedback.

9. An apparatus comprising:
at least one processor and
at least one memory including computer program code, wherein the at least one memory and the computer code are configured, with the at least one processor, to cause the apparatus to at least perform the following:
receiving channel state information reference signal; computing channel support information;
deriving, based on the channel state information, $N_s$ tap locations of channel support, depending on the observed channel and used subcarrier spacing, wherein $N_s$ tap locations is a subset of all tap locations present;
apprising a base station of the $N_s$ tap locations of the channel support;
informing the base station of strongest tap locations, for use in building a channel frequency response, wherein the informing is based on conveying the strongest tap locations via a bit mask; and
determining, prior to the deriving, power class specific window sizes and window offset values,
wherein the deriving is performed in accordance with the determined power class specific window sizes and window offset values,
wherein the tap locations are relative to window sizes, and
wherein the bit mask is specific to a power class specific window size, which corresponds to the strongest tap locations, of the determined power class specific window sizes.

10. The apparatus of claim 9, wherein the informing is based on using L strongest tap locations out of the $N_s$ tap locations of the channel support on all paths and conveying any remaining strongest tap locations via the bit mask.

11. The apparatus of claim 9, wherein transmitting information from the apprising and/or the informing is performed in an independent or joint fashion, wherein the transmitting for the apprising and transmitting for the informing are performed with different periodicities.

12. The apparatus of claim 9, wherein information on the tab locations transferred via the apprising and/or the informing is considered long-term feedback.

\* \* \* \* \*